Sept. 11, 1934.                R. J. DODDS                1,972,921
             AUTOMATIC TUNING DEVICE FOR RADIORECEIVERS
                     Filed July 28, 1933          3 Sheets-Sheet 2
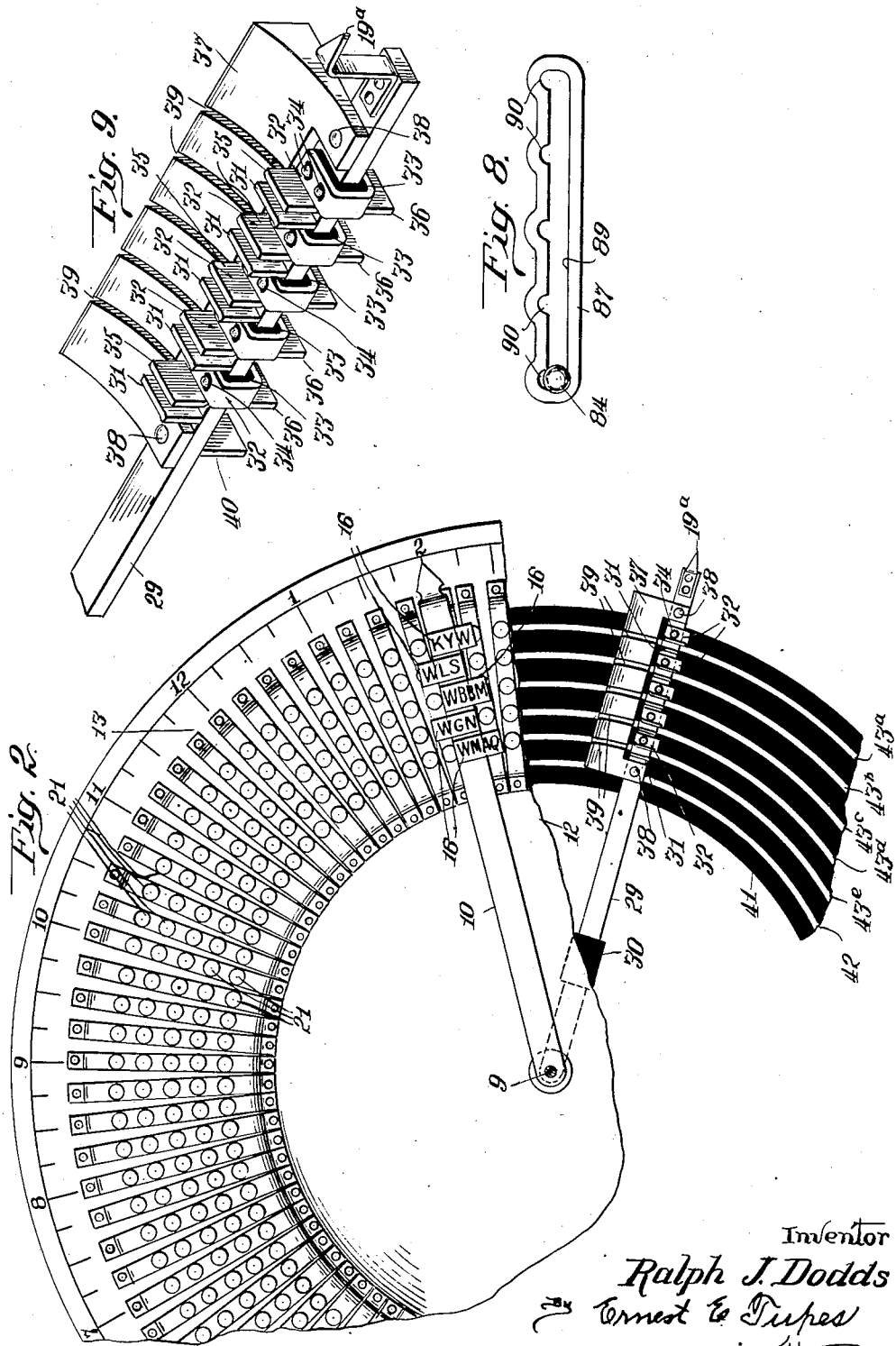

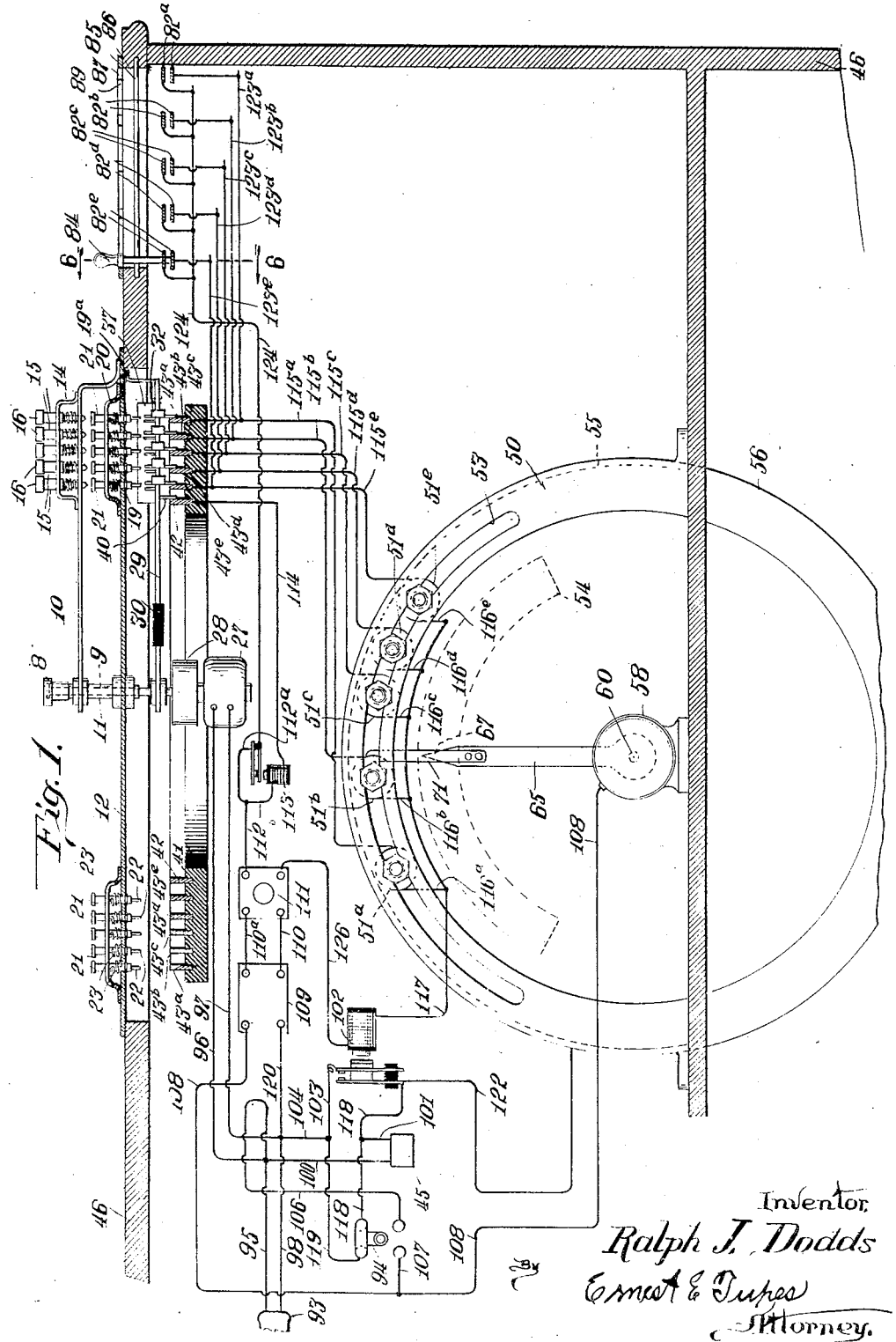
Sept. 11, 1934.  R. J. DODDS  1,972,921
AUTOMATIC TUNING DEVICE FOR RADIORECEIVERS
Filed July 28, 1933  3 Sheets-Sheet 1
Inventor
Ralph J. Dodds
Ernest E. Tupes
Attorney.

Sept. 11, 1934.                R. J. DODDS                1,972,921
              AUTOMATIC TUNING DEVICE FOR RADIORECEIVERS
                      Filed July 28, 1933        3 Sheets-Sheet 3
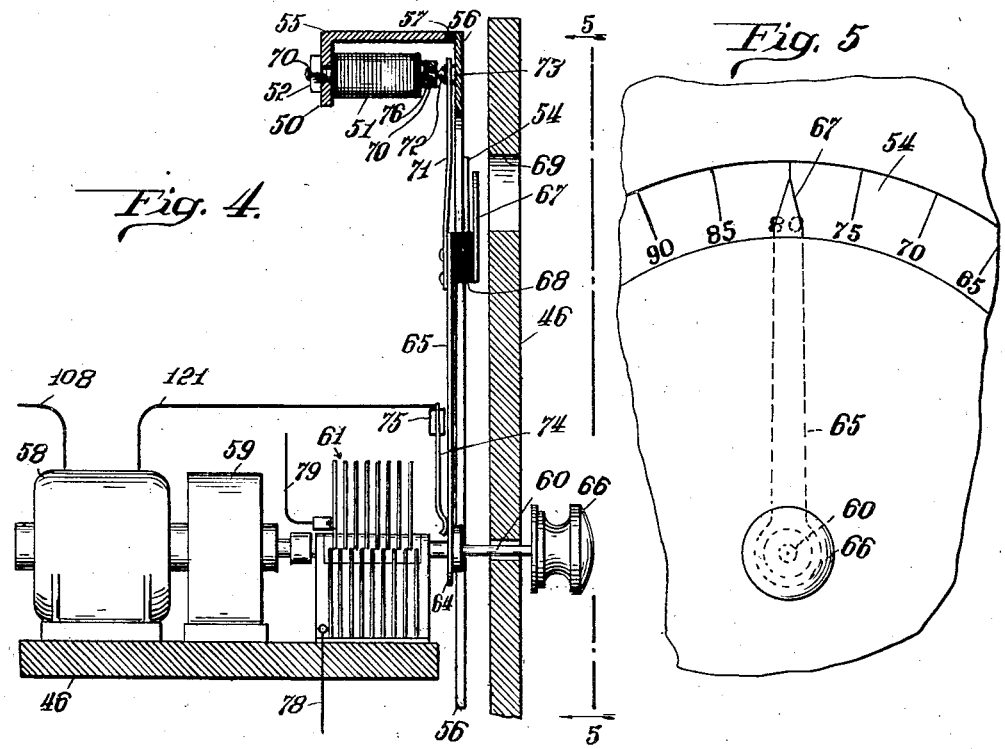
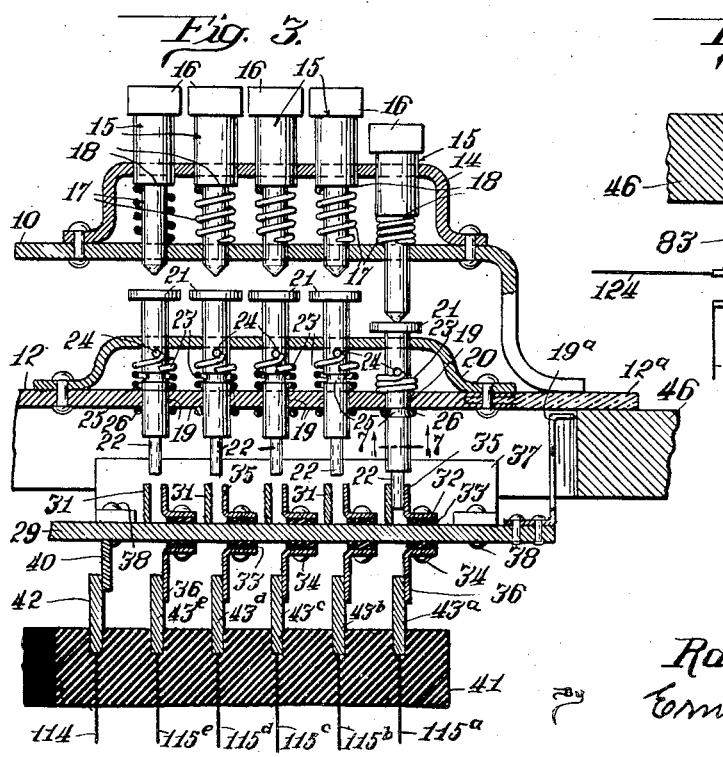
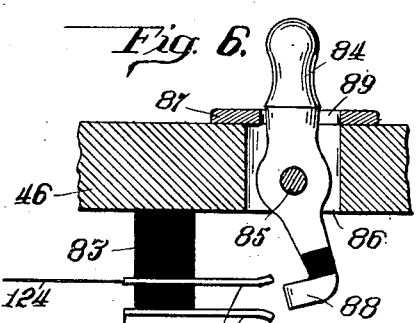
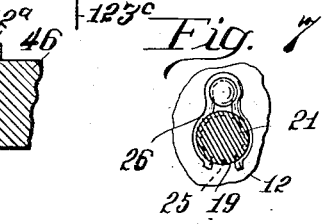
Inventor
Ralph J. Dodds
Ernest E. Pipes
Attorney Patented Sept. 11, 1934

1,972,921

UNITED STATES PATENT OFFICE 1,972,921

AUTOMATIC TUNING DEVICE FOR RADIORECEIVERS

Ralph J. Dodds, Chicago, Ill.

Application July 28, 1933, Serial No. 682,840

3 Claims. (Cl. 250—20)

The invention relates to radio receiving apparatus and more particularly it relates to control means operable to automatically shift the receptivity of such apparatus from one to another of a plurality of selected transmitting stations.

The control means is not only adapted to be set in advance as hereinafter described for automatic control of receptivity for any desired period either continuously or intermittently but also provides means for manually tuning in on selected stations during the intervals when the control means is not automatically operating. The control means is electrically actuated automatically and is so arranged as to be out of operation except when set in advance and, when thus inoperative, the receiving apparatus may be manually manipulated in the usual manner for obtaining receptivity from any transmitting station including those from which the receptivity is obtained automatically when the control means is set to dominate the receiving apparatus.

An object of the invention is the provision of improved control means for radio receiving apparatus adapted to be set in advance to automatically and selectively shift the receptivity from one of a plurality of transmitting stations to another at predetermined intervals either to produce a continuous program or to stop the reception at intervals of predetermined lengths and then either to automatically continue the reception from the station last previously automatically tuned in or to automatically selectively shift the reception to another of said transmitting stations.

Another object of the invention is the provision of improved receptivity control means of the kind described adapted to be set in advance to automatically secure receptivity from any of a plurality of transmitting stations in any desired sequence, either continuously or intermittently, for selected time intervals covering all or any portions of a day of twenty-four hours, such control to start either immediately upon the setting or at any desired interval after such setting of the control means.

Another object of the invention is the provision in combination with automatic control means of the kind described, of improved manually manipulated control means operable to tune in on any one of said plurality of transmitting stations during the intervals when the receiving apparatus is not dominated by the automatic control means.

The control means when quiescent is also adapted to permit the manual operation of such apparatus in the usual manner to tune in on all available transmitting stations including those selected to obtain receptivity automatically and a still further object of the invention is the provision of automatically operable receptivity control means of the kind described which may be selectively manipulated to permit the receiving apparatus to be partially or entirely freed from the dominance of the control means.

A further object of the invention is the provision of receptivity control means of the kind described which is simple, durable, reliable, efficient and satisfactory for its intended purpose.

Many other objects and advantages of the construction herein shown and described will be obvious to those skilled in the art from the disclosure herein given.

To this end, my invention consists in the novel construction, arrangement and combination of parts herein shown and described, and more particularly pointed out in the appended claims.

In the drawings, wherein like reference characters indicate like or corresponding parts:

Fig. 1 shows a wiring diagram and a view of some of the elements in which the invention is embodied;

Fig. 2 is a fragmentary view of a portion of the device comprising a time graduated dial plate and a pair of arms respectively rotatable above and below the plate and in close proximity thereto and a partial showing of members carried by the dial plate;

Fig. 3 is a view to a larger scale of a portion of the plate and the arms shown in Fig. 2;

Fig. 4 is a view of a portion of a station selector device forming a portion of the control means;

Fig. 5 is a view taken along the line 5—5 of Fig. 4;

Fig. 6 is a view along the line 6—6 of Fig. 1 drawn to a larger scale;

Fig. 7 is a view along the line 7—7 of Fig. 3 drawn to a larger scale;

Fig. 8 is a detail view of a portion of the automatic control means; and

Fig. 9 is a perspective view of the outer end of one of the arms shown in Figs. 2 and 3, including circuit making and breaking contact means mounted thereon.

Referring now more particularly to the drawings, the control means may be located in any desired position, preferably in the top of the radio cabinet where it is easily observed and accessible for manipulation. The various members and conductors comprising the control means are in general shown diagrammatically only and are mounted upon and fastened to the radio cabinet in any suitable manner. A complete disclosure of the mounting and fastening means of all the various members and elements is omitted as being unnecessary to an understanding of the invention.

Fragmetary portions of the walls and partitions of the radio cabinet are shown and are all generally designated by the numeral 46. The control means includes a dial plate 12 preferably constructed of bakelite or similar insulating material having its outer periphery comprising an annular band 12a of transparent material. The band 12a provides graduations 13 indicating the twenty-four hours of the day and the intermediate quarter-hour periods over which an arm 10 is manually rotatable in either direction. A synchronous or clock motor 27, positioned underneath the plate 12, is operatively connected by a set of reduction gears 28 with a shaft 9 projecting up through the plate. A pair of lock nuts 7 are mounted on the shaft 9 and positioned one above and the other below the plate 12 in spaced apart relation to permit rotation of the shaft. A sleeve 11 on the shaft 9 provides a mounting for the arm 10 permitting the latter to be rotated independently of the shaft.

The shaft 9 and the arm 29 carried thereby are actuated by the motor 27 to make a complete revolution once every twenty-four hours. The outer end of the arm 29 is constructed of suitable conducting material for a purpose hereinafter described and is insulated from the inner end of the arm by a connection 30. A knob 8 is provided on the upper end of the shaft 9 for use in setting the clock motor 27 and arm 29 so that the latter will point to the proper dial reading in accordance with the actual time.

The plate 12 has a plurality of apertures 19 formed therein, each aperture providing a mounting for a punch button 21 as best shown in Fig. 3, the apertures and buttons being arranged in a plurality of circular rows. Each circular row comprises ninety-six of the apertures 19 and buttons 21. Each aperture 19 and button 21 in each circular row is positioned in radial alignment with the adjacent apertures and buttons of the contiguous rows and with the hour and quarter-hour dial graduations 13. When the arm 10 is manually manipulated so that it points toward any one of the dial graduations 13, it is in exact alignment with one of the underlying ninety-six radial rows of apertures 19 and buttons 21. As many circular rows of apertures 19 are provided as there are selected transmitting stations, receptivity from which is to be automatically controlled by the device. Five of such circular rows of apertures 19 and punch buttons 21 are shown in the drawings and for illustrative purposes, the outer circular row is designated as corresponding to station KYW and the other four rows as corresponding to stations WLS, WBBM, WGN and WMAQ in the order named reading towards the center, it being understood, however, that the device is adapted to be constructed to automatically control receptivity from any other selected number of transmitting stations by correspondingly varying the number of rows of apertures 19 and buttons 21 mounted therein.

An annular member 41, constructed of insulating material, is positioned under the apertures 19 and the buttons 21 carried by the plate 12. The member 41 is concentric with the shaft 9 and so positioned that the free end of the rotating arm 29 moves above the member and in close proximity thereto. A plurality of concentric rings 43 of conducting material are partially embedded in the upper face of the member 41, the rings being designated in the order of their diameters beginning with the largest as 43a, 43b, 43c, 43d and 43e. The arm 29 is provided with a downwardly projecting stem 40 of conducting material positioned in contact with the ring 42 and with a plurality of spaced apart upwardly projecting stems 31 also constructed of conducting material as best shown in Figs. 3 and 9. As many stems 31 are provided as there are rows of apertures 19 and buttons 21, the stems 31 and 40 being preferably formed integral with the arm 29 but may be separately formed and fastened in any suitable manner such as welding, or the like, if desired. A plurality of clevis-shaped members 32 are provided in the same number as there are rows of apertures 19 and buttons 21, the members being also constructed of conducting material and mounted on the arm 29 each in predetermined spaced apart relation to one of the contiguous stems 31. The clevis-shaped members 32 are each insulated from the arm 29 by a member 33 and are fastened to the arm by pins 34 also constructed of insulating material. Each clevis-shaped member 32 has an upwardly projecting stem 35 in parallel spaced apart relation to the contiguous stem 31, and to a downwardly projecting stem 36. The stems 36 are so positioned as to constantly contact with the adjacent one of the rings 43a, 43b, 43c and 43d and 43e for all positions of the arm 29. The contiguous upwardly projecting stems 31 and 35 are so positioned that the spaces therebetween are respectively underneath and aligned with the circular rows of apertures 19 and buttons 21 in the plate 12.

The arm 29 is constantly connected with a conductor 114 through the stem 40 and the ring 42. Similarly, the clevis members 32, including the stems 35 and 36, are respectively continuously connected with branch conductors 115a, 115b, 115c, 115d and 115e through the rings 43a, 43b, 43c, 43d and 43e. Inasmuch as the clevis members 32 are insulated from the arm 29 and the stems 35 are spaced apart from the stems 31, the circuits through the conductor 114 and the conductors 115a, 115b, 115c, 115d and 115e are normally broken. Selective closing of the circuits comprising the conductor 114 and the individual conductors 115a, 115b, 115c, 115d and 115e, is accomplished by manual manipulation of the contact buttons 21, which are so mounted as to be longitudinally movable in the apertures 19. Each radial row of buttons 21 projects up through a bar 20 which serves as a guide to maintain the buttons in vertical position. Only a few of the bars 20 are shown in Fig. 2, it being understood that each radial row of buttons 21 is provided with such a guide bar.

The buttons 21 are constructed of insulating material with their lower ends terminating in a pin 22 of conducting material suitably fastened to the button and adapted to closely fit within the underlying space between the stems 31 and 35. A compression spring 23 is mounted on each of the buttons 21 with one end fastened to the button by a pin 24 and the other end bearing against the top of the plate 12. The springs 23 normally maintain the buttons 21 in elevated position with the pins 22 overlying the corresponding spaces between the stems 31 and 35.

The springs 23 yield under pressure to permit the buttons 21 to be lowered to a position wherein the corresponding spaced apart stems 31 and 35 contact with the opposite sides of the pin 22 and thus selectively complete the circuits from the arm 29 to the conductors 115a, 115b, 115c, 115d and 115e. The stems 31 and 35 are so positioned on the arm 29 that they initially contact with the depressed pin 22 when the arm is pointed to a time graduation 13. A member 29a fastened to the outer end of the arm 29 provides a pointer adapted for accurate determination of the position of the arm in setting the motor 27. The stems 31 and 35 are preferably of such a length that they are moved out of contact with the pin 22 for a time interval of a minute or so before the arm 29 reaches the next quarter hour time graduation 13.

The buttons 21 are each maintained in their depressed position by a spring clip 26 mounted on the underside of the plate 12. The clips 26 are each fastened to the plate 12 in any suitable manner such as by rivets 44 and are so arranged that they enter a peripheral groove 25 in the button 21 when the latter is depressed to operative position.

The arm 10 carries a plurality of punch buttons 15 one overlying each of the circular rows of contact buttons 21. The upper ends of the buttons 15 project through a guide bar 14 and terminate in a cap 16, the lower ends of the buttons each being offset to provide a shoulder 18. The lower ends of the buttons 15 project through the body of the pointer arm 10 and are normally held out of contact with the buttons 21 by a compression spring 17. Each spring 17 encircles a button 15 with one end abutting the shoulder 18 and the other end bearing on the top face of the arm 10. The springs 17 are adapted to yield under pressure to permit the button 15 controlled thereby to be moved into contact with and depress the underlying contact button 21 to its operative position as shown in Fig. 3. The upper face of the cap 16 on each of the buttons 15 is marked to indicate the particular transmitting station, receptivity from which is obtained in a manner hereinafter more particularly described by depressing a contact button 21 of the underlying row.

The arm 10, being manually rotatable about the shaft 9, is adapted to be freely moved as described in either direction to utilize the punch buttons 15 to selectively depress the contact buttons 21 to operative posiiton and as a result, the revolving arm 29 will open and close the circuits through the conductor 114 and the conductors 115a, 115b, 115c, 115d and 115e in any desired sequence either continuously or with intervals during which the circuits through the arm 29 remain open. The pointer arm 10 can be accurately and quickly set upon any desired dial reading 13 as a preliminary to depression of the contact buttons 21, in accordance with a selected program, to insure that the proper button will be depressed without the painstaking care that would otherwise be required to avoid error by depressing the wrong button.

The springs 17 act to return the punch buttons 15 to their normal elevated position immediately upon the release of pressure thereon. The contact buttons 21, however, remain in their depressed operative position until the arm 29, travelling in clockwise direction as observed in Fig. 2, has passed thereunder and maintained electrical connection for approximately one-quarter of an hour between the arm 29 and the particular branch conductor 115 controlled thereby. The depressed contact button 21 upon disengaging the stems 31 and 35 is then returned to its normal elevated inoperative position by the action of a cam member 37 of insulating material, following the rotating arm 29 and fastened thereto by pins 28. The member 37 is thereby moved into contact with the lower end of the depressed button 21. The member 37 is provided with an upper curved cam surface in which are a plurality of grooves 39 each adapted to receive a pin 22. Contact of the upper curved surface of the member 37 with the lower end of the depressed button 21 moves the button upwardly and forces the spring clip 26 out of the groove 25. The button 21 thus released from holding engagement with the clip 26 is returned by the action of the spring 23 to its normal elevated position out of the path of the cam member 37, in which position, the pin 22 will also clear the stems 31 and 35 on the rotating arm 29.

The rings 43a, 43b, 43c, 43d and 43e are respectively connected through the conductors 115a, 115b, 115c, 115d and 115e with coils 51 individually designated as 51a, 51b, 51c, 51d and 51e which form a portion of a station selector device including a ring 50 providing a slot 53. The coils 51a, 51b, 51c, 51d and 51e are mounted on the ring 50 by means of bolts 70 projecting through the slot 53 and are fastened by a nut 2. The bolts 70 each provide a core for a coil 51, the free ends of which terminate adjacent to a conductor ring 56. The ring 50 is concentric with the ring 56 and is provided with a flange 55 forming means for mounting the ring 50 on the ring 56. The flange 55 is fastened to the ring 56 in any suitable manner such as by screws (not shown), the flange and ring being separated by a gasket 57 of suitable insulating material.

The station selector also includes a shaft 60, concentric with the rings 50 and 56, and a synchronous motor 58 operatively connected with the shaft 60 by speed reducing gear mechanism shown diagrammatically and designated by the numeral 59. A variable condenser 61 and an arm 65, mounted on the shaft 60 are thereby operatively connected with the motor 58. The shaft 60, the arm 65 and the condenser 61 may also be manually operated by rotating a knob 66, fixedly mounted on an end of the shaft which projects through the wall 46 of the cabinet, it being understood that the condenser 61 when manually operated may bring in receptivity from any available transmitting station.

The arm 65 terminates in a pointer 67 rotatable over a graduated tuning dial plate 54, the pointer being insulated from the arm by a spacer member 68, the plate and pointer being visible through a slot 69 in the cabinet 46. The arm 65 is provided with a hub mounting 64, insulated from the shaft 60. A brush member 74 operatively engaging the hub 64 and a conductor 121, connecting the brush member 74 with the motor 58, completes an electrical connection between the arm 65 and the motor. A resilient member 71, forming an extension of the arm 65, has a cone-shaped member 72 mounted on its outer end. The member 72 is adapted to closely fit within a corresponding cone-shaped aperture 76 in the free end of the cores 70. The resilient member 71 normally maintains the position shown in Fig. 4 with the member 72 disengaged from the cores 70 and is rotated by the arm 65 both when the arm is actuated manually and by the motor 58. Electrical connection of the resilient member 71 with the ring 56 is maintained through a block 73 of conducting material mounted on the member 71 opposite to the member 72. Rotation of the arm 65 and the resilient member 71 successively brings the resilient member into proximity to the cores 70 of the coils 51. Energization of a coil 51 serves to pull res'lient member 71 towards the energized coil and to bring the member 72 into the aperture 76, thereby breaking the circuit through the arm 65 to the motor 58 and stopping the motor with the member 72 in the aperture.

Manually operable means is also provided for obtaining reception from the selected transmitting stations in the intervals when the automatic control means is not dominating receptivity therefrom. The manually operable means comprises a lever 84 pivotally mounted on and slidable longitudinally on a rod 85, positioned in a slot 86 in the cabinet 46, as best shown in Figs. 1, 6 and 8. A guide member 87, mounted on the cabinet 46, forms a cover for the slot 86 and also provides a slot 89 through which the lever 84 projects. The inner end of the lever 84 has a lateral projection 88 insulated therefrom and so positioned that rotation of the lever from selected positions on the rod 85 operatively engages and disengages the projection with any one of a plurality of pairs of contact members 82 individually designated as 82a, 82b, 82c, 82d and 82e. The guide member 87 provides a plurality of recesses 90 opening into the slot 89, each recess being adapted to receive the lever 84 when it is rotated in clockwise direction from circuit breaking position as shown in Fig. 6 to a position where the projection 88 contacts with a selected pair of contact members 82. The recesses 90 are so positioned that the projection 88 will engage the individual pairs of contact members 82 only when the lever 84 is positioned in the corresponding recess.

The radio receiving apparatus and automatic and manually operated control means are connected with the same source of electricity through circuits terminating in a pair of conductors 95 and 98 which are connected with a wall plug 93.

The radio receiving apparatus proper, diagrammatically illustrated and designated by the numeral 45, may be operated in the usual manner independently of either the automatic or manually actuated control means through a circuit connected with the wall plug 93 and hereinafter designated as circuit number one. Circuit number one comprises conductors 95, 100, radio set 45, conductors 101 and 118, relay 102, conductors 103, 104 and 98.

The synchronous or clock motor 27, forming a portion of the automatic control means is operatively connected with the wall plug 93 through a circuit hereinafter designated as circuit number two and comprising conductors 95, 96, 97 and 98.

The individual coils 51a, 51b, 51c, 51d and 51e, also forming a portion of the automatic and manually actuated control means, are separately energized by their respective connections through conductors 116a, 116b, 116c, 116d and 116e with a circuit designated as number three. Circuit number three comprises conductors 117, relay 102, conductor 126, rectifier tube 111, conductor 110, transformer 109, conductors 120 and 98, wall plug 93, conductors 95 and 106, two-way switch 94 in opposite position from that shown, conductors 107 and 108, transformer 109, conductor 110a, rectifier tube 111, conductor 112, relay 113, conductor 114, ring 42, stem 40 and arm 29. The stems 31 on the arm 29, the clevis members 32 including their upwardly and downwardly projecting stems 35 and 36, the rings 43a, 43b, 43c, 43d and 43e and the conductors 115a, 115b, 115c, 115d and 115e, respectively, provide branch circuits from the arm 29 adapted to selectively energize the coils 51a, 51b, 51c, 51d and 51e. The branch circuits, thus adapted to respectively complete circuit number three and energize the corresponding coils 51, are normally broken between the stems 35 and 31 and are closed only when a depressed pin 22 is positioned therebetween during rotation of the arm 29 as described.

The radio receiver 45 is not operable through circuit number one with the switch 94 in opposite position from that shown. However, it does operate when circuit number three is closed due to the relay 102 being energized and thereby connecting the radio with the wall plug 93 by an independent circuit comprising conductors 95 and 100, radio set 45, conductors 101 and 118, relay 102 and conductors 103, 104 and 98.

Energization of the coils 51a, 51b, 51c, 51d and 51e is also selectively accomplished by manual manipulation of the lever 84 as heretofore described, as a result of which the coils are connected with another circuit designated as circuit number four. Circuit number four comprises the conductor 117, relay 102, conductor 126, rectifier tube 111, conductor 110, transformer 109, conductors 120 and 98, wall plug 93, conductors 95 and 106, switch 94 in opposite position from that shown, conductors 107 and 108, transformer 109, conductor 110a, rectifier tube 111, conductors 112 and 112a, relay 113 and conductor 124. Circuit number four is completed between the conductor 124 and the conductor 117 by any one of five branch circuits respectively comprising one of the pair of contact members 82a, 82b, 82c, 82d and 82e, the conductors 123a, 123b, 123c, 123d and 123e and the conductors 115a, 115b, 115c, 115d and 115e whereby the coils 51a, 51b, 51c, 51d and 51e are selectively energized in the same manner as by the automatically controlled branch circuits completing circuit number three as above described. The branch circuits through the pairs of contact members 82a, 82b, 82c, 82d and 82e are opened and closed by manually shifting the lever 84 longitudinally of the rod 85 to position it in the corresponding recess 90, in the manner hereinbefore described, with the result that the radio set 45 is operated by the independent circuit through the energized relay 102 in the same manner as described for circuit number three.

The motor 58 is connected with a source of electrical energy through a circuit designated as number five, one branch of which starts with the wall plug 93 and includes conductors 95 and 106, switch 94, conductors 107 and 108. The other branch of circuit number five includes conductors 121, brush arm 74, hub 64, arm 65, resilient member 71, contact member 73, ring 56, conductor 122, relay 102, conductors 103, 104 and 98.

The radio receiving apparatus may be operated independently of the automatic or manually actuated control devices with the two-way switch 94 in the position shown in Fig. 1 in which position the circuit heretofore described as number one is completed and circuits number three, number four and number five are open or inoperative. The condenser 61, shown in Fig. 4, is a part of the radio receiving apparatus and is operatively connected by conductors 78 and 79, respectively, with the grid and filament, and with the inductance coil of the receiving apparatus, none of which are shown. The condenser 61 may be rotated manually by actuating the knob 66 in the usual manner to bring in any desired transmitting station including those dominated by the control devices. Since the coils 51 are not energized when the switch 94 is in the position shown, the cone-shaped member 72, carried by the resilient member 71 and by the arm 65, remains clear of the coils 51 and the resilient member 71 is positioned with the member 73 in contact with the ring 56 as the shaft 60 and the condenser 61 are manually rotated. The motor 58 being disconnected from the source of electrical energy by reason of circuit number five being broken, may also be rotated in turning the knob 66 to move the condenser 61 to obtain receptivity from any desired transmitting station.

Circuit number two being independent of the switch 94, the synchronous motor 27 is constantly connected with a source of electrical energy through circuit number two which leads to the wall plug 93 and it is, therefore, continuously in operation and rotating the arm 29 at all times. The arm 29 may be accurately set to point to the proper graduations 13 in accordance with the actual time, following disconnection of the wall plug 93 and also to correct the position of the arm as a result of circuit number two being broken by removal of the wall plug from its socket.

The automatic and manually actuated control devices are operable to dominate receptivity from the selected transmitting stations only when the switch 94 is moved to connect the conductor 106 with the conductor 107. In this position of the switch 94, the automatic control device will dominate receptivity if only a single button 21 of the five buttons comprising a radial row is depressed. Obviously, all or any number less than all of the radial rows of buttons may have a single button 21 depressed and thereby be set in advance to control receptivity for the particular quarter-hour period or periods during which the arm 29 is in operative engagement with the depressed button 21. Since the corresponding coil 51 is energized through circuit number three and the motor 58 is simultaneously put in operation by its connection with the source of electrical energy through circuit number five, the motor 58 will continue to rotate until the cone-shaped member 72 is positioned immediately over the core 70 of the energized coil whereby circuit number five is broken by the resilient member 71 being pulled away from the ring 56 and the contact member 73 is disconnected from the ring. Circuit number five remains broken at the ring 56 only so long as the particular coil 51 so dominating it is energized by its connection with circuit number three. Immediately upon circuit number three being broken by reason of the arm 29 moving out of operative engagement with the particular depressed button 21 that has been operating to close this circuit, circuit number five is again closed at ring 56 by the resilient member 71 receding from the core 70 and taking its normal position. However, circuit number five is broken at relay 102 when circuit number three is broken at the arm 29 and the motor 58 remains inoperative until the arm has moved into operative engagement with the next depressed button 21 in advance of the arm. Should the next depressed button 21 be in the adjacent radial row of buttons, only a minute or two will elapse before circuit number three is again closed and as a result, circuit number five will be also closed at the relay 102. Should the depressed button 21 of the next adjacent radial row be in the same circular row of buttons as the last operating depressed button, the same coil 51 will be energized and the resilient member 71 will simultaneously again break circuit number five at the ring 56 and thereby prevent motor 58 from operating with the result that the program is continued from the same transmitting station as in the previous quarter-hour period. Should the depressed button 21 of the next radial row be in some other circular row than that of the depressed button last completing circuit number three, closing of circuit number three by operative engagement therewith of the arm 29 will energize another coil than the one last energized. Circuit number five being closed back at the ring 56 and through relay 102, motor 58 will start and resilient member 71 will be rotated thereby until it is positioned over the particular energized coil 51. Circuit number five will then be broken at the ring 56 and receptivity from the corresponding transmitting station will continue during the quarter-hour period at the end of which the arm 29 will have moved out of operative engagement with the depressed button and circuit number three will again be broken resulting in breaking circuit number five at relay 102 and closing it at ring 56. Should the next depressed button 21 not be in the adjacent radial row but in some more distant row in advance of the arm 29, circuit number three will remain broken until the arm has moved into operative engagement therewith. During the quarter-hour period or multiples thereof required for the arm 29 to reach the point where it operatively engages the nearest depressed button 21 in advance, circuit number three remains broken. Circuit number five will remain closed during this time at the ring 56 by reason of member 73 being in contact with the ring but it will remain broken at the relay 102. Immediately upon closing of circuit number three, circuit number five will close through relay 102 and if the button 21 then previously closing circuit number three is in some circular row other than in which the last operative depressed button was positioned, motor circuit number five remains closed until motor 58 has rotated member 71 to a point over the newly energized coil 51 when the motor circuit is again broken at the ring 56. Should the button 21 operating to complete circuit number three be in the same circular row of buttons as the depressed button 21 last operating to close circuit number three, circuit number five will close at the relay 102 but will be simultaneously broken at the ring 56 and the program will then continue. From the foregoing description, it is obvious that by depressing buttons 21 selectively in advance, any desired program, either continuous or intermittently broken for one or more quarter-hour periods, will be automatically brought in from the selected transmitting stations.

During the intervals when the automatically operating control device is quiescent by reason of none of the corresponding buttons 21 being depressed, the manually operable device may be utilized to bring in any of the selected transmitting stations otherwise controlled by the automatic device. This is accomplished by shifting lever 84 to contact with any one of the pairs of contact members 82, thereby closing circuit number four to energize the corresponding coil 51. Circuit number five will be broken and closed at the ring 56 and at the relay 102 in the same manner as described when the device is automatically operating through circuit number three. By leaving lever 84 in operative position to close circuit number four at any one of the pairs of contact members 82, a continuous program from a single one of the selected transmitting stations may be thus received. By shifting the lever 84 from one pair of contact members 82 to another, the program may be correspondingly shifted from one transmitting station to another. In the event, the operator should intentionally or otherwise leave the lever 84 in position to bring in a station, the automatic control device will nevertheless dominate receptivity by reason of arm 29 contacting with a button 21 since circuit number four will be automatically broken at relay 113 and the program will continue in accordance with the dominance of the automatic control device as determined by the depressed buttons 21. In the next interval in which the automatic control device is not operating to bring in selected stations, should lever 84 still be operatively connected with a pair of contact members 82, circuit number five will be immediately closed through relay 113 and the manually actuated control device will continue to dominate receptivity and bring in the particular transmitting station so connected through circuit number four.

Thus, it will be seen that I have provided novel automatically and manually operative control means for radio receiving apparatus adapted to be set in advance for bringing in any one of a plurality of selected stations to obtain a predetermined program either continuous or intermittent, the manual and automatic control means being selectively operable and the radio being adapted for tuning in on any available station when not dominated by the automatic or manual control apparatus.

Having thus described the invention, it is obvious that various immaterial modifications may be resorted to without departing from the spirit thereof; hence, I do not wish to be understood as limiting myself to the exact form, construction, arrangement and combination of parts herein shown and described, or uses mentioned.

What I claim as new and desire to secure by Letters Patent is:

1. Means for controlling a radio receiver comprising a plurality of control circuits each connected with a source of electrical energy, a continuously rotating clock-driven arm forming a portion of each circuit, said circuits being normally open adjacent said arm, a plurality of circuit closing members arranged circumferentially about the axis of rotation of said arm and normally out of the path of said arm, said members arranged in as many circular rows as there are circuits with the members of each row adapted to be selectively set to individually operatively engage the advancing arm for a definite time period and thereby closing its circuit during such period of operative engagement, a cam member mounted on said advancing arm and operable to return the circuit closing members to their normal position out of the path of said arm following movement of the arm out of operative engagement therewith, and means operable by the closing of said circuits to selectively tune in the receiver with a different transmitting station for each of said circuits.

2. Means for controlling a radio receiver comprising a plurality of control circuits each connected with a source of electrical energy, a continuously rotating clock-driven arm forming a portion of each circuit, said circuits being normally open adjacent said arm and each provided with a circuit closing member normally positioned out of the path of the arm, said members adapted to be severally moved to positions wherein said arm will successively operatively engage therewith and thereby close the corresponding circuit, and means operable to successively tune in the receiver with a different transmitting station by the closing of the individual circuits as described, said tuning means comprising a relay operatively connected with and energized by each of said control circuits, a motor, a circuit operatively connecting said motor with a source of electrical energy, said relay being adapted to close said motor circuit when energized and to open said circuit when deenergized, a tuning shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit while maintaining said arm in circuit-breaking position while said coil is energized.

3. Means for controlling a radio receiver comprising a plurality of control circuits each connected with a source of electrical energy, a continuously rotating clock-driven arm forming a portion of each circuit, said circuits being normally open adjacent said arm and each provided with a plurality of circuit closing members positioned in spaced apart relation and normally out of the path of the arm, said members adapted to be selectively moved to positions wherein said arm will successively operatively engage therewith and thereby close the circuit controlled by said member, and means operable to successively tune in the receiver with a different transmitting station by the closing of the individual circuits as described, said tuning means comprising a relay operatively connected with and energized by each of said control circuits, a motor, a circuit operatively connecting said motor with a source of electrical energy, said relay being adapted to close said motor circuit when energized and to open said circuit when deenergized, a tuning shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit while maintaining said arm in circuit breaking position while said coil is energized.

4. Means for controlling a radio receiver comprising in combination a plurality of circuits each connected with a source of electrical energy, a continuously rotating clock-driven arm forming a portion of each circuit, said circuits being normally open adjacent said clock arm, a plurality of circuit closing members normally positioned out of the path of said arm and each adapted to be moved to a position wherein the advancing arm will contact therewith for a definite period, said members being arranged in as many groups as there are circuits, the members of each group being adapted to close the same circuit when in contact with said arm and each circuit being operatively closed by a different group, and means operable by the closing of said circuits to selectively tune in the receiver on a plurality of transmitting stations, said tuning means comprising a relay operatively connected with and energized by each of said control circuits, a motor, a circuit operatively connecting said motor with a source of electrical energy, said relay being adapted to close said motor circuit when energized and to open said circuit when deenergized, a tuning shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit while maintaining said arm in circuit breaking position while said coil is energized.

5. Means for controlling a radio receiver comprising in combination, a plurality of circuits each connected with a source of electrical energy, a continuously rotating clock-driven arm forming a portion of each circuit, said circuits being normally open adjacent said clock arm, a plurality of circuit closing members normally positioned out of the path of said arm and each adapted to be moved to a position wherein the advancing arm will contact therewith for a definite period, said members being arranged in as many groups as there are circuits, the members of each group being adapted to close the same circuit when in contact with said arm and each circuit being operatively closed by a different group, and means operable by the successive closing of said circuits to selectively tune in the receiver on a plurality of transmitting stations, said means being operable by the closing of any one of said circuits to tune in the receiver with a different transmitting station from that tuned in by the closing of any of the other of said circuits, said tuning means comprising a relay operatively connected with and energized by each of said control circuits, a motor, a circuit operatively connecting said motor with a source of electrical energy, said relay being adapted to close said motor circuit when energized and to open said circuit when deenergized, a tuning-shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit while maintaining said arm in circuit breaking position while said coil is energized.

6. Means for controlling a radio receiver comprising a plurality of control circuits each connected with a source of electrical energy, a continuously rotating clock-driven arm forming a portion of each circuit, said circuits being normally open adjacent said arm, a plurality of circuit closing members arranged circumferentially about the axis of rotation of said arm and normally out of the path of said arm, said members arranged in as many circular rows as there are circuits with the members of each row adapted to be selectively set to individually operatively engage the advancing arm for a definite time period and thereby closing its circuit during such period of operative engagement, a cam member mounted on said advancing arm and operable to return the circuit closing members to their normal position out of the path of said arm following movement of the arm out of operative engagement therewith, and means operable by the closing of said circuits to selectively tune in the receiver with a different transmitting station for each of said circuits, said tuning means comprising a relay operatively connected with and energized by each of said control circuits, a motor, a circuit operatively connecting said motor with a source of electrical energy, said relay being adapted to close said motor circuit when energized and to open said circuit when deenergized, a shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit while maintaining said arm in circuit breaking position while said coil is energized.

7. Means for controlling a radio receiver comprising a plurality of control circuits each connected with a source of electrical energy, a continuously rotating clock-driven arm forming a portion of each circuit, said circuits being normally open adjacent said arm, a plurality of circuit closing members arranged circumferentially about the axis of rotation of said arm and normally out of the path of said arm, said members arranged in as many circular rows as there are circuits with the members positioned in each row adapted to be severally set to individually operatively engage the advancing arm for a definite time period and thereby close its circuit during such period of operative engagement, and means operable by the closing of said circuits to selectivly tune in the receiver with a different transmitting station for each of said circuits, said tuning means comprising a relay operatively connected with and energized by each of said control circuits, a motor, a circuit operatively connecting said motor with a source of electrical energy, said relay being adapted to close said motor circuit when energized and to open said circuit when deenergized, a tuning shaft driven by said motor and operatively connected with the receiver for tuning the same, said control circuits providing individual coils arranged circumferentially about said shaft, a resilient arm forming a portion of said motor circuit and rotatable in circuit closing position by said shaft in proximity to said coils, each of said coils when energized operating to open the motor circuit by maintaining said arm in circuit breaking position while said coil is energized.

8. Means for controling a radio receiver comprising a plurality of control circuits, each connected with a source of electrical energy, said circuits being normally broken at contiguous points, a circuit closing member manually operable to selectively close said circuits, a relay operatively connected with and energized by each of said control circuits, a motor, a circuit operatively connecting said motor with said source of electrical energy, said relay being adapted to close the motor circuit when energized and to break said circuit when deenergized, a tuning shaft driven by the motor and operatively connected with the receiver for tuning the same, said control circuits providing individual coils arranged circumferentially about said shaft, a resilient arm forming a portion of said motor circuit and rotatable about said shaft in circuit closing position in proximity to said coils, each of said coils when energized operating to open the motor circuit by maintaining said arm in circuit breaking position while said coil is energized.

RALPH J. DODDS.